(12) United States Patent
Lu

(10) Patent No.: US 12,350,605 B2
(45) Date of Patent: Jul. 8, 2025

(54) SYSTEM TO REUSE FATS, OILS, AND GREASE

(71) Applicant: University Of Cincinnati, Cincinnati, OH (US)

(72) Inventor: Mingming Lu, Mason, OH (US)

(73) Assignee: University of Cincinnati, Cincinnati, OH (US)

( * ) Notice: Subject to any disclaimer, the term of this patent is extended or adjusted under 35 U.S.C. 154(b) by 0 days.

(21) Appl. No.: 18/423,497

(22) Filed: Jan. 26, 2024

(65) Prior Publication Data

US 2024/0238698 A1 Jul. 18, 2024

Related U.S. Application Data

(62) Division of application No. 17/806,613, filed on Jun. 13, 2022, now Pat. No. 11,911,710.

(60) Provisional application No. 63/209,537, filed on Jun. 11, 2021.

(51) Int. Cl.
*B01D 11/04* (2006.01)
*B65D 88/26* (2006.01)
*C11B 13/00* (2006.01)

(52) U.S. Cl.
CPC ...... *B01D 11/0457* (2013.01); *B01D 11/0492* (2013.01); *B65D 88/26* (2013.01); *C11B 13/00* (2013.01); *B01D 2221/06* (2013.01)

(58) Field of Classification Search
CPC ............ B01D 11/0457; B01D 11/0492; B65D 88/26; C11B 13/00
See application file for complete search history.

(56) References Cited

U.S. PATENT DOCUMENTS

| | | | |
|---|---|---|---|
| 11,339,341 B1 * | 5/2022 | McCarthy | ............... C10L 5/365 |
| 2011/0197497 A1 * | 8/2011 | Jiang | ........................ C11B 3/006 137/13 |
| 2016/0257908 A1 | 9/2016 | Cairncross et al. | |

OTHER PUBLICATIONS

Tu et al., A solvent-free approach to extract the lipid fraction from sewer grease for biodiesel production, Waste Management 54 (2016) 126-130.

* cited by examiner

*Primary Examiner* — Sean E Conley
(74) *Attorney, Agent, or Firm* — Wood Herron & Evans LLP

(57) ABSTRACT

A method of forming a yellow grease is provided. The method includes delivering a FOG lipid extraction agent into a processing tank. The method further includes preheating an FOG to a temperature of between 35° C. and 95° C. The method further includes mixing the preheated waste grease with the FOG lipid extraction agent in the processing tank to form the yellow grease.

7 Claims, 5 Drawing Sheets

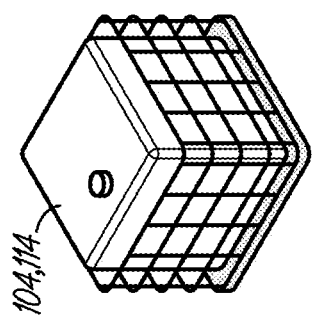
FIG. 4D
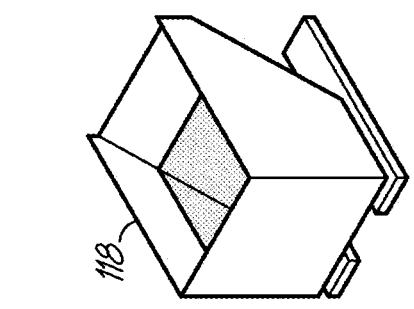
FIG. 4C
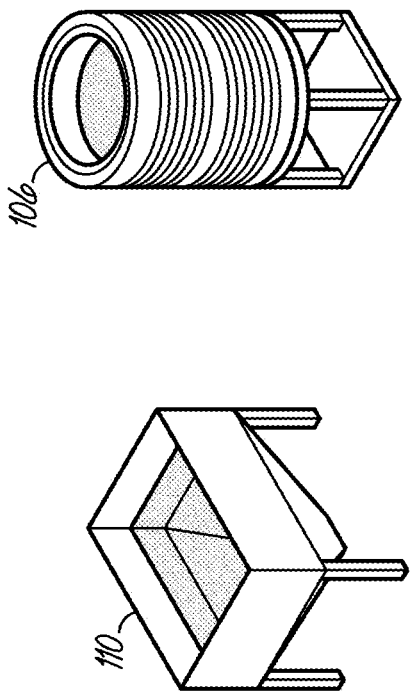
FIG. 4B
FIG. 4A
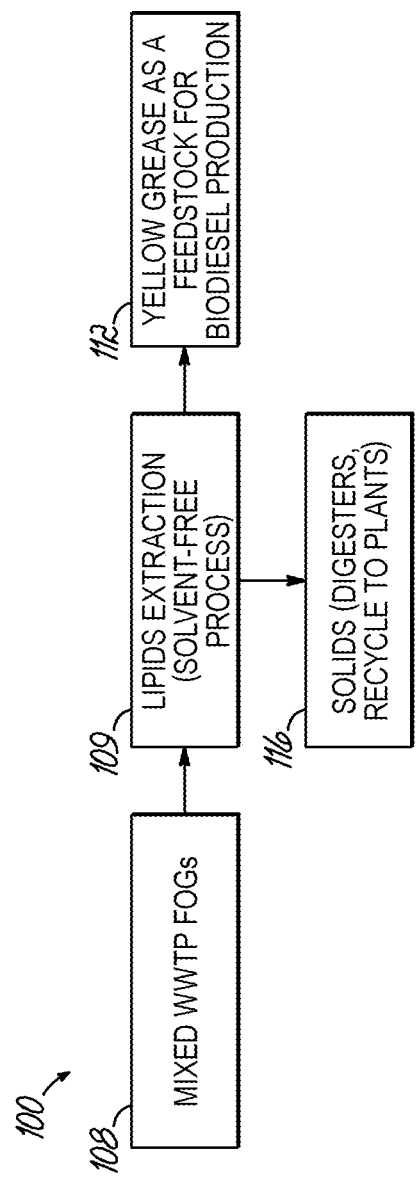
FIG. 5

SYSTEM TO REUSE FATS, OILS, AND GREASE

CROSS-REFERENCE TO RELATED APPLICATIONS

This application is a divisional patent application claiming priority to, and benefit of the filing date of, U.S. patent application Ser. No. 17/806,613, filed Jun. 13, 2022, which in turn claims priority to and benefit of the filing date of, U.S. Provisional Application No. 63/209,537, filed Jun. 11, 2021, the disclosures of which are incorporated by reference in their entirety.

STATEMENT OF FEDERALLY SPONSORED RESEARCH

This invention was made with government support under IIP-1919114 awarded by National Science Foundation Division of Industrial Innovation and Partnerships. The government has certain rights in the invention.

FIELD OF THE INVENTION

Exemplary embodiments of the present invention relate generally to fats, oils, and grease (FOG), and to systems for reuse of those materials, including both trap grease generated by food service operations and sewer grease (scum or skimmings) that comes from FOG generators such as food processors, food producers, Wastewater Treatment Plants (WWTP), grease haulers, oil handlers, and the like.

BACKGROUND OF THE INVENTION

Fats, Oils, and Grease (FOGs) have been a burden to society by causing pipeline blockage, sewer overflow, property damage, and taking up space in landfills. A large part of FOGs are processed at FOG generators such as food processors, food producers, WWTPs, grease haulers, oil handlers, and the like, before being sent to landfills as waste grease (WG). In previous processes, the processing of waste grease mainly consists of part or all of the following: floating them in a primary treatment, skimming off a top layer, placing waste grease into a concentrator, and placing the waste grease into a waste disposal container. This is done to reduce the amount of water in the waste grease as much as possible. With an increasing population, it is reasonable to assume that the amount of waste grease that FOG generators will have to process will only increase. Trap grease amount may also increase.

Therefore, a more environmentally friendly approach to reduce the amount of waste grease sent to landfills, and an approach to harvest the lipids from waste grease to be used in other applications, such as for a biodiesel or other applications.

SUMMARY OF THE INVENTION

Certain exemplary aspects of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be explicitly set forth below.

Aspects of the present invention overcome and/or reduce the drawbacks described above by providing a method and system for solvent-free extraction of FOGs to reduce emulsion in a low cost and eco-friendly manner.

Aspects of the present invention use the "like dissolves like" principle to extract FOG-lipid from its water emulsion state using waste grease and heat. By doing so, it can generate three possible product, non-portable water, lipids (in the form of yellow grease) and solids (as fertilizer or for digestors). It is a solvent free lipid extraction process, since the process does not use chemical solvents such as hexane or isopropyl alcohol. The cost of the typical chemical solvents, such as hexane or isopropyl alcohol may be significant, and also may require special safety considerations. Furthermore, the process described herein also does not need a solvent evaporation process to use the product, a yellow grease with <15% free fatty acid, and low in moisture, too.

A purpose of the invention, then, is to reuse FOGs as value added products, which are otherwise mostly landfilled (a burden).

In operation, the various aspects of the present invention can be used to extract lipids from fats, oils and grease generated in WWTPs, food processing operations or grease haulers. The central lipid extraction unit incorporates waste grease and uses the "like dissolves like" principle to extract FOG-lipid from its water emulsion state. The FOG and a FOG lipid extraction agent are mixed in a reactor, following a ratio and temperature specially designed for the FOG. The pilot system improves on the design of previous methods and systems to improve extraction efficiency/lower the cost.

It was determined that preheating the FOGs will enhance extraction efficiency, and can potentially reduce reaction time in the next unit. In the extraction unit, a weir design is used to effectively separate the end product.

In terms of physical, chemical, biological and/or electrical characteristics of the invention, this disclosure includes both the solvent-free lipid extraction technology, and also the unique design of the pilot process.

The FOG lipids in its original form are often referred to as brown grease (FFA much higher than 15%), and cannot be directly used as a biodiesel feedstock. With the present invention, lipids were extracted without solvents, improved on the quality and therefore enabled its reuse. The design enhanced the technology and can reduce the cost. It does have sophisticated electronic control/automation.

One aspect of the invention, then is directed to a system for forming a yellow grease involving a solvent-free extraction of fats, oils, and grease from waste grease. The system includes a FOG lipid extraction agent tote. The system further includes a pretreatment tank configured to contain a waste grease therein. The system further includes a processing tank configured to receive a waste grease and a FOG lipid extraction agent, and further configured to form the yellow grease when the FOG lipid extraction agent and the waste grease are mixed within the processing tank. The system further includes a yellow grease tote configured to receive the yellow grease from the processing tank. The system further includes a hopper configured to receive an amount of wet solids from the processing tank.

In a related embodiment, the processing tank further includes a belt heater configured to adjust a temperature of FOG lipid extraction agent when the FOG lipid extraction agent is within the processing tank.

In a related embodiment, the processing tank further includes a port to receive the waste grease.

In a related embodiment, the processing tank further includes a port to receive the FOG lipid extraction agent.

In a related embodiment, the processing tank further includes an agitator depending from a top wall of the processing tank, the agitator configured to mix the FOG lipid extraction agent and the waste grease when each are within the processing tank.

In a related embodiment, the processing tank further includes a weir located a distance from a bottom wall of the processing tank, the weir having an opening configured to accept the yellow grease from the processing tank.

In a related embodiment, the weir is coupled to a flexible metal pipe, the flexible metal pipe positioned to allow the yellow grease accepted by the weir to flow to the yellow grease tote.

In a related embodiment, the processing tank further includes a volume of between 50 gallons and 500 gallons.

In a related embodiment, the processing tank further includes a pump in communication with the FOG lipid extraction agent tote, wherein the pump is configured to assist in the transportation of the FOG lipid extraction agent from the FOG lipid extraction agent tote to the processing tank.

In a related embodiment, the processing tank further includes a trash pump configured to direct a wet solid from the processing tank to the hopper.

Another aspect of the invention, then, is directed to a method of solvent-free extraction of fats, oils, and grease from waste grease. The method includes delivering a FOG lipid extraction agent into a processing tank, preheating a waste grease to a temperature of between 35° C. and 95° C., and mixing the preheated waste grease with the FOG lipid extraction agent in the processing tank to form the yellow grease.

In a related embodiment, the method includes delivering the FOG lipid extraction agent into the processing tank occurring when the FOG lipid extraction agent is at ambient temperature.

In a related embodiment, the method includes harvesting the yellow grease into a yellow grease tote.

In a related embodiment, harvesting the yellow grease includes adding water to the processing tank until a level of the yellow grease in the processing tank reaches a weir located within the processing tank, the weir accepting the yellow grease, and transporting the yellow grease from the weir to a yellow grease tote.

In a related embodiment, the method includes a ratio of the FOG lipid extraction agent to the waste grease in the processing tank is between 1:1 and 16:1 by mass.

In a related embodiment, the method includes collecting at least one wet solid from the processing tank after mixing the preheated waste grease and the FOG lipid extraction agent.

In a related embodiment, the method is completed within two hours.

In a related embodiment, the processing tank used in the method includes volume of between 50 gallons and 500 gallons.

In a related embodiment, the method includes the FOG lipid extraction agent being heated in the processing tank prior to the mixing of the preheated waste grease with the FOG lipid extraction agent.

In a related embodiment, the FOG lipid extraction agent is heated to a temperature of between 40° C. and 100° C.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

FIG. 4A is a perspective view of a pre-treatment tank used in the system described herein;

FIG. 4B is a perspective view of a processing tank used in the system described herein;

FIG. 4C is a perspective view of a hopper used in the system described herein;

FIG. 4D is a perspective view of a tote used in the system described herein;

FIG. 5 is a process flow diagram for a method of producing a yellow grease from a fats, oils, and grease feed.

DETAILED DESCRIPTION OF THE PREFERRED EMBODIMENTS

Figure 1:
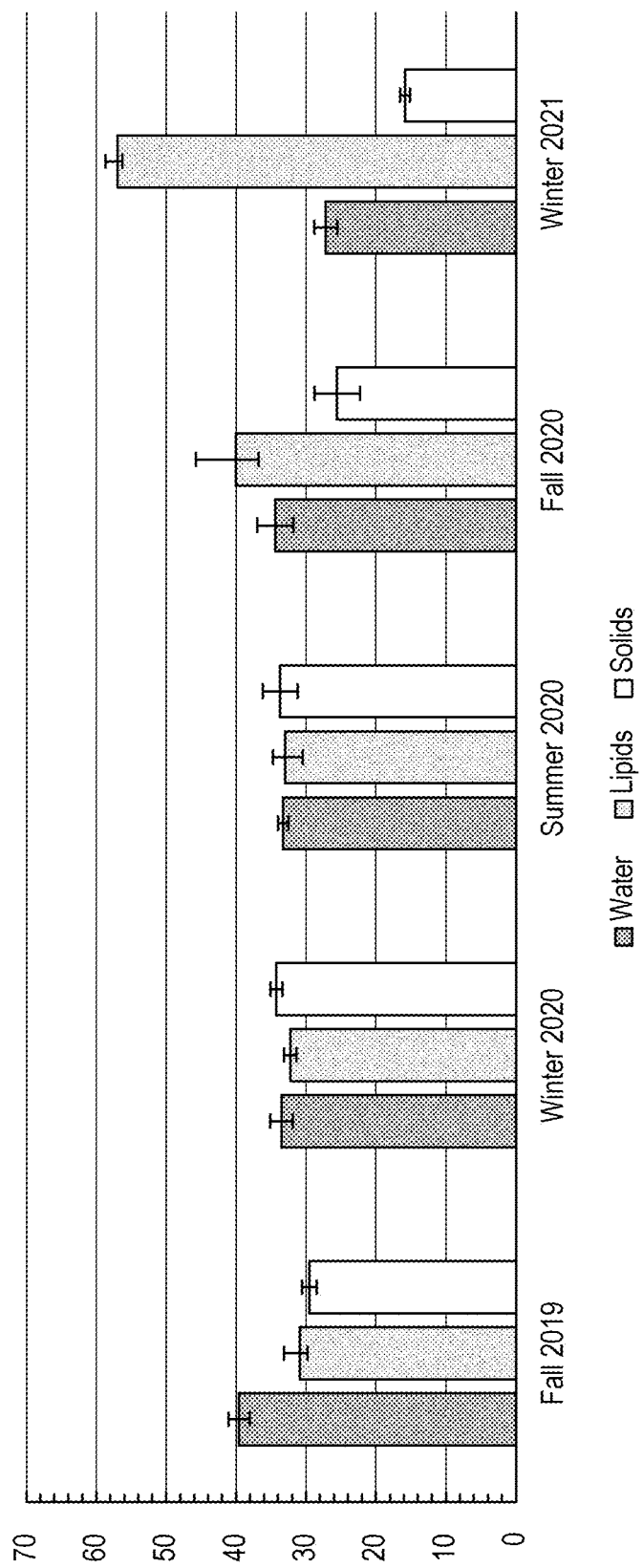
FIG. 1 is a bar graph that shows sample compositions of samples collected in Southwest Ohio.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Referenced herein are several ASTM test methods, which are standard testing procedures designed to measure particular parameters of samples. Specifically referenced herein are ASTM D6751, the standard specification for biodiesel fuel blend stock, and ASTM D4176, ASTM D1298, ASTM D93, ACOS CK2-09, ASTM D6304, and ASTM D7501. A short description of each of these tests is provided below.

ASTM D6751 covers biodiesel fuel blend stock in Grades S15 and S500 for use as a blend component with middle distillate fuels. ASTM D6751 prescribes the required properties of diesel fuels at the time and place of delivery. ASTM D6751 defines a "biodiesel" as mono-alkyl esters of long chain fatty acids derived from vegetable oils and animal fats.

ASTM D4176 is a qualitative method to determine purity of biodiesel. As used herein, approximately 300 mL of biodiesel were placed in a glass bottle. A grading sheet was placed on the opposite side of the biodiesel and a grade is assigned depending on the thinnest visible line.

ASTM D1298 is a quantitative method to determine purity of biodiesel. As used herein, approximately 50 mL of biodiesel were placed into a graduated cylinder, then a hydrometer was placed into the biodiesel. A measurement level was read off the hydrometer to determine density of the biodiesel.

ASTM D93 is a quantitative method to determine the flash point of biodiesel samples. As used herein, approximately 60 mL of biodiesel were placed into an Automatic Pensky-Martens Flash Point Tester. The sample was heated from ambient temperature to 123° C. Once the sample temperature reached 63° C., an ignitor was placed near the sample every increase in 1° C. until 123° C. was reached.

ACOS Ck2-09 is a quantitative method for determining a variety of properties of biodiesel using a QTA-specific infrared spectrometer. As used herein, an approximately 30 µL sample was placed onto the QTA-FTIR and scanned for properties locally. The preliminary results were then transmitted to QTA's central database, where algorithms proprietary to QTA were used to generate the results. Properties determined by this method include the content of methanol, free glycerin, monoglycerin, diglycerin, triglycerine, total glycerin, moisture, acid number, sulfur, and cloud point.

ASTM D6304 is a quantitative method to determine moisture amounts in biodiesel samples. As used herein, approximately 1 mL of biodiesel was collected in a plastic 1 ml syringe. The 1 mL sample was placed into a Metrohm Karl Fischer Coulometer and the moisture content was determined based in the mass of the sample.

ASTM D7501 is a quantitative method to determine purity of biodiesel. As used herein, approximately 300 mL of biodiesel were placed into a glass bottle, and then placed in a cold bath. This cold bath was below the cloud point of the biodiesel (approximately 0° C.). After 2 hours, the sample was removed from the cold bath and allowed to sit in a warm bath that was at ambient temperature (25° C.) for one hour. After the warm bath, the sample was vacuum filtered at ~70-85 kPa using a 2MIL glass microfiber filter. A stopwatch was used to measure the time it took for the sample to completely clear the filter.

All ranges of parameters or values described herein include the endpoints of the range. Parameters of the unit operations described herein refer to pilot-scale unit operations, and may be scaled up or down, while remaining within the conception of the invention.

As described above, aspects of the present invention overcome and/or reduce the drawbacks described above by providing a method and system for solvent-free extraction of FOGs from water-FOG emulsions, such as waste grease. Specifically, a novel, Solvent-Free Extraction (SFE) system and method has been developed to reduce the amount of waste grease at FOG generators such as food processors, food producers, WWTPs, grease haulers, oil handlers, and the like further than previous methods have been able to achieve.

Figure 2:
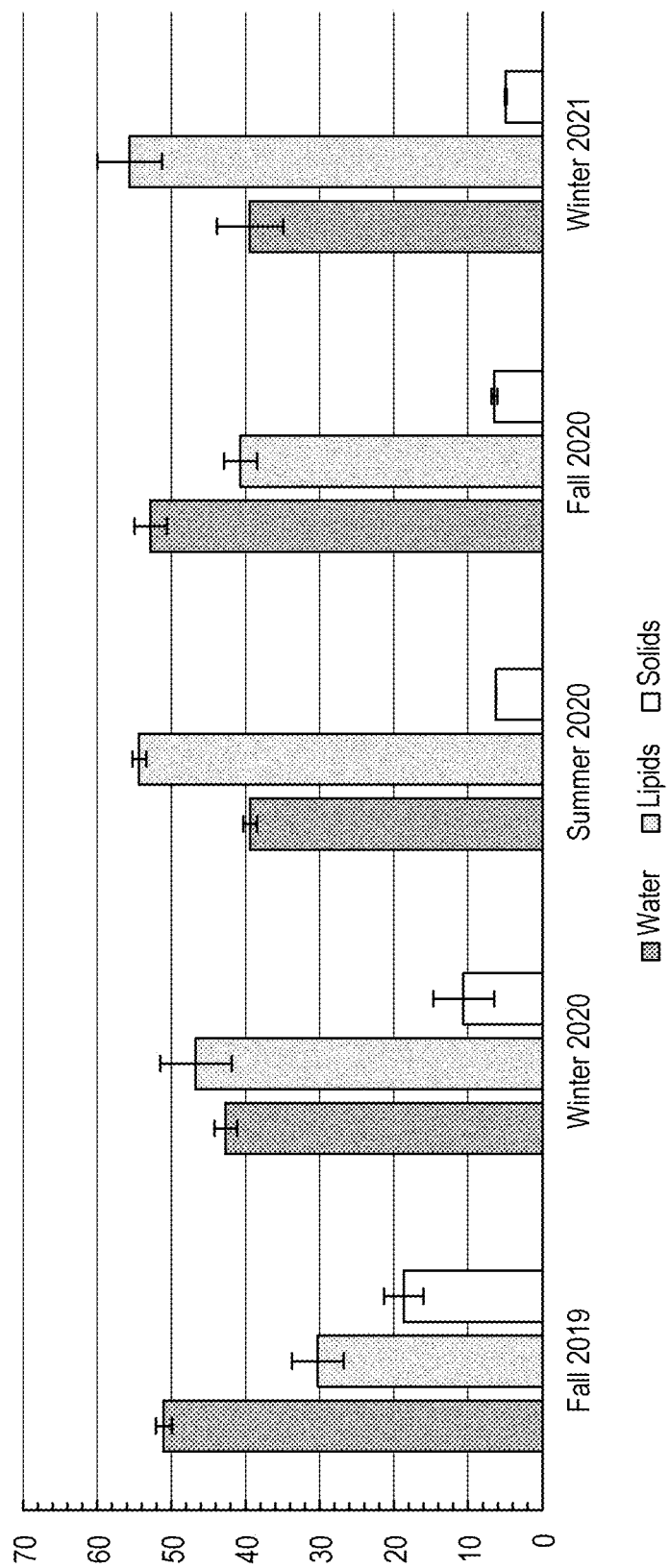
FIG. 2 is a bar graph that shows sample compositions of samples collected in Northern Kentucky.

Since FOGs are mainly considered as a waste material, the compositions can vary frequently, and therefore it is important to characterize these periodically. FOG samples from two wastewater treatment plants (WWTP) were collected for use in analytical methods (FIGS. 1 and 2). FOG 1 was from a WWTP in Southwest Ohio, and FOG 2 was from a WWTP in Northern Kentucky. The materials needed for characterization of the samples included hexane for solvent extraction and isopropyl alcohol, KOH, and phenolphthalein for titration. Metal tracing used $HNO_3$ and deionized water. Solvent free extractions and upscale solvent free extractions utilized FOG lipid extraction agent (WCO) from various restaurants in the Greater Cincinnati Area. Upscale extractions require metal tanks, chemical totes, heating straps, and other hardware and electrical equipment.

FOGs composition has continued to be studied in order to provide some data about the characteristics of waste grease. FOGs from different sources have been collected and tested for moisture, oil-content, and trace metals, etc. FOGs were collected multiple times a year in order to determine if there are any patterns to their seasonal variability. Alongside FOG characterization, a pilot-scale process has been designed based on previous bench-scales test. This pilot will allow an even higher volume of waste grease to be processed to determine the economic feasibility of this technology.

In order to determine seasonal variation of FOG feedstock (waste grease), FOG samples from Southwest Ohio (FIG. 1) and Northern Kentucky (FIG. 2) were taken each season from Fall 2019 to Winter 2021 (excluding Spring 2020 due to COVID-19 closures). Characterization of these samples was done using the method described in Williams et al 2012. Percent $H_2O$ was determined by heating 100 g of waste grease (WG) to 100° ° C. for 24 hours and weighing. Next, four ~30 g samples of waste grease were measured. $H_2O$ was removed via the same heating method as before. The four samples were weighed to confirm the % $H_2O$, and hexane was added in a ratio of 10 mL of hexane to 1 g of dried waste grease. The waste grease and hexane mixture was covered and stirred for 24 hours to allow the hexane to extract all the oil. The hexane-oil mixture and the remaining solids were separated via filtration. The solids were then weighed to determine the solids and oil fractions. All samples were titrated using a greener titration method developed by the inventor's group, which is compatible with the official AOCS Cd 3d-63.

FIG. 1 is a bar graph that shows sample compositions of waste grease samples collected in Southwest Ohio. As shown in FIG. 1, there was a period when the composition of the FOG was constant from Winter to Fall in 2020. This consistent composition can be attributed to FOG from Southwest Ohio actively being dried to decrease the amount of water included therein. This period matched compositions during previous studies. Consistency in the composition of the samples is usually desirable in biodiesel feedstock supply as it allows the process to be the most predictable. However, the latest sample from Winter 2021, shown in FIG. 1 had the highest lipid fraction that has been observed so far. While high lipid fractions would ordinarily be desired because so as to allow for a higher yield of yellow grease, such vast differences between lipid fractions from previous seasons will decrease the predictability of processes that rely on consistent compositions of feedstock, such as biodiesel. If the composition continues to fluctuate in such a wide manner, manufacturing processes may be negatively affected.

FIG. 2 is a bar graph that shows sample compositions of waste grease samples collected in Northern Kentucky. The samples shown in FIG. 2 have a significant amount of water when compared to the samples shown in FIG. 1. This can be attributed to the fact that the samples from Northern Kentucky are not dried before disposing. Because this waste grease is mainly from restaurants in the Northern Kentucky area, there is a higher lipid fraction. At least because the waste grease does not go through any sewer system, the solids included in the waste grease is relatively low compared to the samples shown in FIG. 1. While the high amount of lipids in the samples shown in FIG. 2 is desirable for a higher yellow grease yield, the high amount of water could prove troublesome from an energy demand standpoint at least because the waste grease needs to be heated, and water has a high heat capacity.

Figure 3:
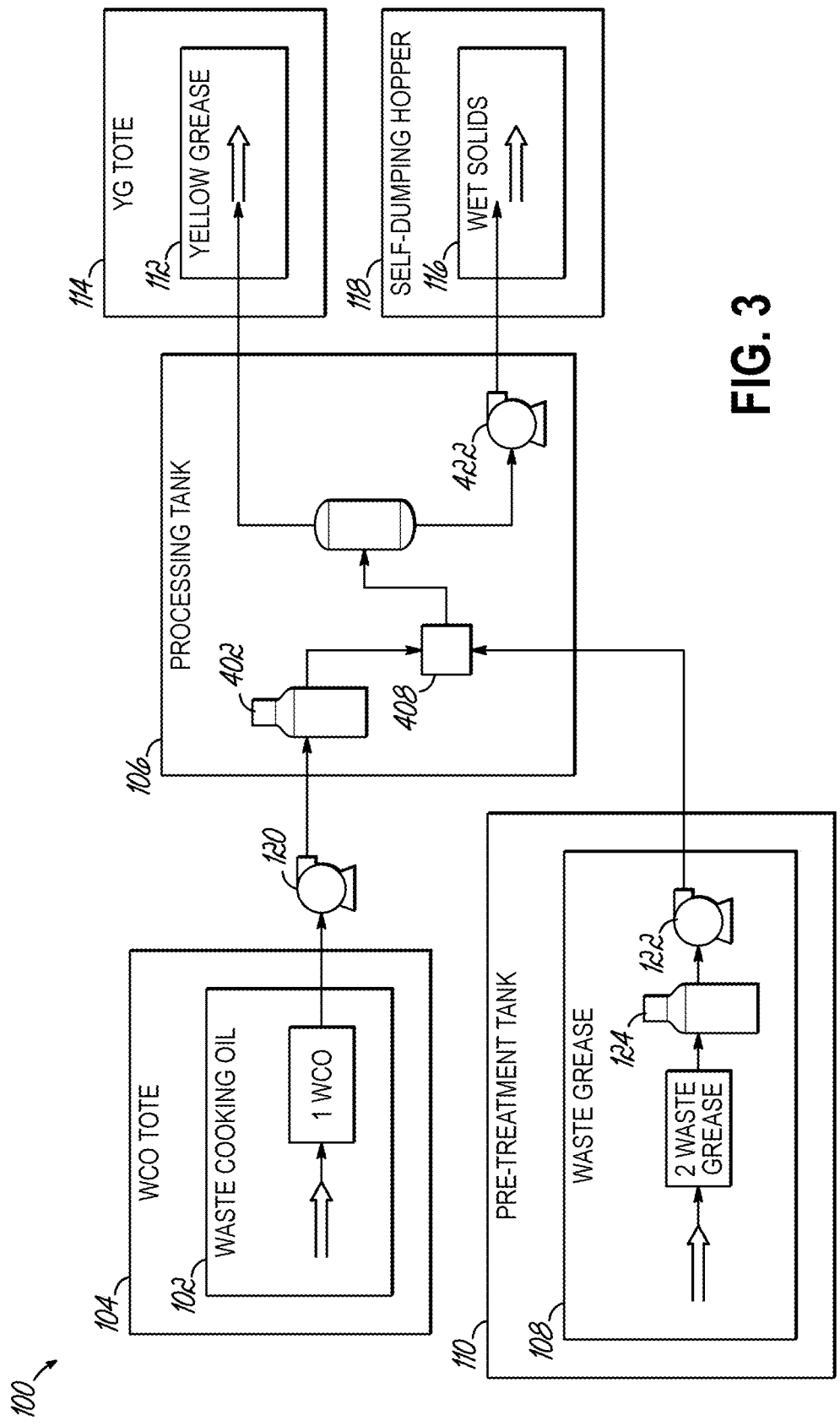
FIG. 3 is a process flow schematic for a system to form yellow grease for biodiesel feedstock.

FIG. 3 shows a process flow 100 of a SFE system and method according to an embodiment of the present invention. The process flow 100 includes moving a predetermined amount of a FOG lipid extraction agent 102 from a FOG lipid extraction agent tote 104 to a processing tank 106. The FOG lipid extraction agent 102 is an extracting agent configured to extract FOG-lipid, or non-polar material from the waste grease 108. In the processing tank 106, the FOG lipid extraction agent 102 is brought to a temperature of between 40° C. and 100° C., preferably between 60° ° C. and 80° C., and more preferably to exactly or about 70° C. Concurrently or sequentially to the FOG lipid extraction agent 102 being brought to temperature in the processing tank 106, a waste grease 108 is brought to a temperature of between 40° C. and 60° C., preferably to 50° C., in a pre-treatment tank 110. Once the FOG lipid extraction agent 102 and the waste grease 108 are brought to their respective desired temperatures, the waste grease 108 is introduced into the processing tank 106 with the FOG lipid extraction agent 102, and mixed in the processing tank 106. The mixing of the FOG lipid extraction agent 102 and the waste grease 108 separates a yellow grease 112 from the mixture of FOG lipid extraction agent 102 and waste grease 108. The yellow grease 112 is moved into a yellow grease tote 114, removing the yellow grease 112 from the mixture of FOG lipid extraction agent 102 and waste grease 108. In some embodiments, the yellow grease 112 is moved into the yellow grease tote 114 by gravity feed, however, other forms of transportation of the yellow grease 112 are possible such as by a pump such as an in-line pump or peristaltic pump. The yellow grease 112 may be packaged or stored, and in some examples, may be used as a feedstock for biodiesel fuel applications. For example, the yellow grease 112 may be converted into biodiesel feedstock by a biodiesel manufacturing process. It has been observed in lab tests that the ambient temperature FOG lipid extraction agent 102 has a higher density than the heated yellow grease 112, and accordingly, the method described herein takes advantage of the separation of these components in order to extract the yellow grease from the processing tank 106.

Removing the yellow grease 112 from the processing tank 106 leaves wet solids 116 in the processing tank 106, or vice versa. The wet solids 116 include materials, such as food materials and the like, that are not separated into the yellow grease 112 from either the FOG lipid extraction agent 102 or the waste grease 108. The wet solids 116 may be pumped, such as by an in-line or peristaltic pump, from the processing tank 106 or moved by gravity feed from the processing tank 106 into a hopper 118. The hopper 118 may be a self-dumping hopper or other hopper that is configured to be at least partially filled with wet solids 116, for example. In some examples, the wet solids 116 may be used in incineration or digestion applications.

Referring to particular species used in the process flow 100, the FOG lipid extraction agent 102 is any suitable substance configured to at least partially form yellow grease 112 when mixed with the waste grease 108. In particular, the FOG lipid extraction agent 102 may be any suitable substance configured to extract a lipid fraction of FOGs from the waste grease 108, forming the yellow grease 112. In some examples, the FOG lipid extraction agent 102 is any individual or combination of cooking oils that may have previously been used by restaurants and may include, referred to as "waste cooking oils, which may include among others, olive oil, vegetable oil, soybean oil, and the like. This list is not intended to be exhaustive of examples of cooking oils that may be used as the FOG lipid extraction agent 102. Rather, any edible oil that may have previously been used by a restaurant is suitable. It is also not necessary that the FOG lipid extraction agent 102 actually have been used by a restaurant or in any cooking application prior to its use as the FOG lipid extraction agent 102. In an embodiment, the FOG lipid extraction agent 102 may include exactly or about 6 wt % free-fatty acid content.

There are advantages of using the FOG lipid extraction agent 102 over other extraction methods, some of which may require chemical solvents which may be corrosive, hazardous, or ineffective, or "new" to biodiesel producers. For example, FOG lipid extraction agent 102 is not a solvent, and is accordingly less deleterious than alternative methods. Furthermore, FOG lipid extraction agent 102 has free fatty acid solubility that is very high (>93.7%) compared to solvents that may be used in other methods. Even further, FOG lipid extraction agent 102 is immiscible with water, which provides easy separation of the organic fraction from the wet solids 116, which include water and solids from the waste grease 108. In examples provided herein, the yellow grease 112 produced includes a free fatty acid content of less than 15 wt %, in sharp contrast to brown grease that has higher free fatty acid content.

The waste grease 108 includes water, lipids, and/or solids, for example, from food waste. The waste grease 108 may be received from generators such as waste water treatment plants, and would typically be discarded by the generators who typically pay a fee to send the waste grease 108 to a landfill. The waste grease 108 includes organic content including FOGs, water, and other solids not configured to be separated from the waste grease 108 by the methods and systems described herein.

The yellow grease 112 produced by the system and methods described herein includes a free fatty acid content of less than 15 wt %, in sharp contrast to brown grease that has higher free fatty acid content. For example, some haulers may separate the lipids in the waste grease 108 through heating and filtration to produce a brown grease (FFA>15%), which has a much lower market value. As of 2016, yellow grease produced by the systems and methods described herein have a market value of 21 U.S. cents/pound value, brown grease sells for only 5 U.S. cents/pound, which is generally not profitable. As of this filing, the FOG lipid extraction agent 102 is priced at $0.7-0.8/lb, while brown grease price increased since 2016. Further advantages other than cost advantageous are present from the yellow grease 112 formed from the systems and methods described herein. Particularly, in biodiesel manufacturing applications, biodiesel formed by brown grease does not meet the 15 ppm sulfur specification of ASTM 6751, and is not be acceptable to the market. Entities other than the inventors or Applicant have tried to solve this problem, and have been unsuccessful. The San Francisco Public Utilities Commission attempted to process FOG to biodiesel, but failed to meet the sulfur limit. For examples of the failure of others to cure these deficiencies in the art, see URS Corp, 2010, Brown Grease Demo Biodiesel Plant Starts Up. http://www.biodieselmagazine.com/articles/4460/brown-grease-demo-biodiesel-plant-starts-up/(accessed January 2019); see also Voegele, E., 2009. Biodiesel in the Golden Gate City. Biodiesel Magazine, February Issue, http://www.biodiesel-magazine.com/article.jsp?article_id=3156 (accessed January 2019).

FIGS. 4A-4D show the units that may be used to store, transport, or otherwise accommodate the FOG lipid extraction agent 102, waste grease 108, the yellow grease 112 and/or the wet solids 116 shown in the process flow 100 shown in FIG. 3. Particularly, FIG. 4A shows the pre-treatment tank 110 which is used to store the waste grease 108 prior to its introduction into the processing tank 106. In a pilot scale, the pre-treatment tank 110 is made of metal and measures exactly or about 0.9144 meters in diameter (3 feet) by 0.9144 meters (3 feet) in height. The pre-treatment tank 110 may be moveable by a forklift from a fat, oil, grease concentrator (not shown) which may be located at a waste water treatment plant, and may be used to collect the waste grease 108 used by the process flow 100. The pre-treatment tank 110 may be equipped with one or more heater belts, immersion heaters, and/or trash pumps. The heater belts and/or immersion heaters may be configured to heat and/or maintain a temperature of the waste grease 108 while the waste grease 108 is inside of the pre-treatment tank 110.

Referring to FIG. 4B, a second unit used in the process flow 100 is shown. Specifically, FIG. 4B shows the processing tank 106, which may be a solvent-free extraction processing unit. The processing tank 106 is where the solvent-free extraction occurs during operation of the process flow 100. In an embodiment, at pilot-scale, the processing tank 106 has a volume between 50 gallons and 500 gallons, preferably, between 150 gallons and 250 gallons, and more preferably 200 gallons. In an embodiment, the processing tank 106 is made of stainless steel and is configured to receive the waste grease 108 from the pre-treatment tank 110 as well as the FOG lipid extraction agent 102 from the FOG lipid extraction agent tote 104, either in a continuous flow or a batch process. In some embodiments, the processing tank 106 is configured to operate at least between 35° C. and 95° C., preferably between 65° C. and 75° C., and more preferably at least at 70° C., and may be equipped with a belt heater 402, ports 404, level sensor 406, agitator 408, weir 416, and flexible pipes 414 (shown in FIG. 6).

The processing tank 106 takes advantage of the different specific gravities that are unique to the FOG lipid extraction agent 102, the waste grease 108, the yellow grease 112, and the wet solids 116. As described above, it has been observed in lab tests that the ambient temperature FOG lipid extraction agent 102 has a higher density than the heated yellow grease 112. Yellow grease 112 has a reported specific gravity of 0.89 g/mL and the most commonly FOG lipid extraction agent 102 has a specific gravity of 0.917 g/mL (soybean oil). Accordingly, the yellow grease 112 can be displaced to the weir 416 (shown in FIG. 6) with the introduction of ambient temperature FOG lipid extraction agent 102. The method described herein may be run continuously, semi-continuously, or as a batch process. In embodiments including at least a semi-continuous method, yellow grease 112 may be removed from the processing tank 106 while introducing fresh FOG lipid extraction agent 102 and waste grease 108.

The processing tank 106 has advantages over traditional mixing tanks at least because the processing tank 106 allows yellow grease 112 to be collected with minimal contaminants from the waste grease 108 by utilizing the weir 416. In addition, the yellow grease 112 is gravity fed from the weir 416 into the yellow grease tote 114, which assists to reduce the number of pumps used and the amount of energy consumed. The weir 416 is also adjustable in order to accommodate different extraction ratios.

Referring to FIG. 4C, a third unit used in the process flow 100 is shown. Specifically, FIG. 4C shows the hopper 118. The hopper 118 may be a self-dumping hopper, and may be configured to unload contents therein without an operator coming into direct contact with the hopper 118. In some embodiments, the hopper 118 is configured to receive wet solids 116 from the processing tank 106. For example, the hopper 118 may receive wet solids 116 from the processing tank 106 when the wet solids 116 are collected and transported from the processing tank 106 via the trash pump 422 (shown in FIG. 6).

Referring to FIG. 4D, a fourth unit used in the process flow 100 is shown. The unit shown in FIG. 4D refers to both the FOG lipid extraction agent tote 104 and the yellow grease tote 114. The FOG lipid extraction agent tote 104 is a tank or container that stores the FOG lipid extraction agent 102 prior to its introduction into the processing tank 106. In some embodiments, the FOG lipid extraction agent tote 104 may be in communication with a pump 120 such as an in-line pump or peristaltic pump, configured to transport the FOG lipid extraction agent 102 from the FOG lipid extraction agent tote 104 into the processing tank 106. The unit shown in FIG. 4D also refers to the yellow grease tote 114. The yellow grease tote 114 is configured to accept the yellow grease harvested from the processing tank 106 after the separation of the yellow grease 112 occurs within the processing tank 106. The yellow grease 112 may be transported to the yellow grease tote 114 by gravity feed from the processing tank 106, and is described in more detail below. In some examples, one or both of these totes 104, 114 may be IBC tanks and have a volume between 250 gallons and 300 gallons, preferably 275 gallons, and each may be equipped with an oil pump configured to transport the FOG lipid extraction agent 102 or the yellow grease 112, respectively.

Referring to FIG. 5, the process flow 100 is again shown, in simplified terms. The waste grease 108, as described above, may also refer to the mixed FOGs received from a waste water treatment plant (WWTP). The waste grease 108 is fed into the lipids extraction (solvent-free process) 109, which is described in more detail herein. However, the lipids extraction (solvent-free process) generally refers to the process that occurs within the process tank 106 as described herein, and produces the wet solids 116 and yellow grease 112, shown in FIG. 5.

Figure 6:
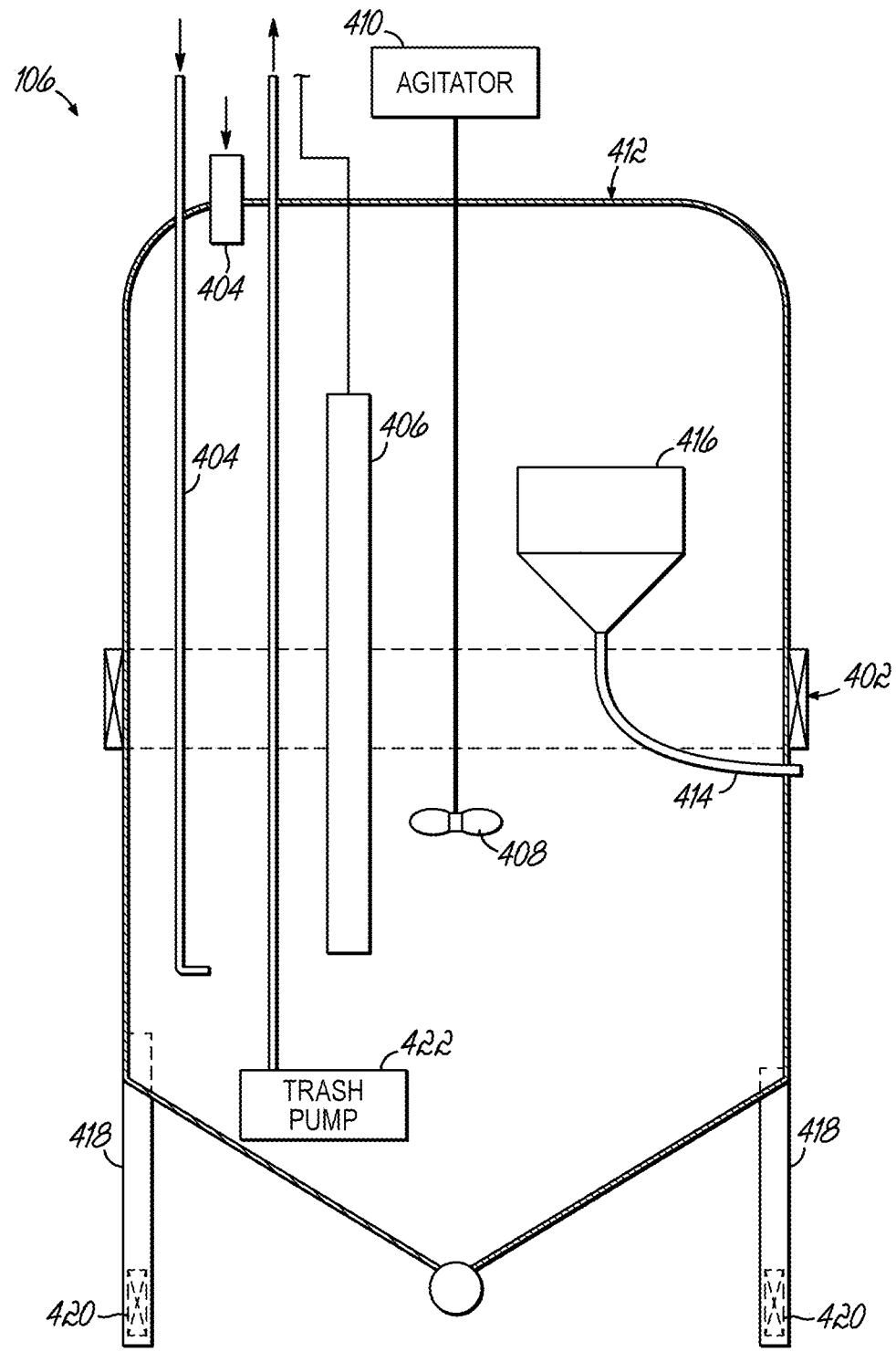
FIG. 6 is a schematic of the processing tank shown in FIG. 4B.

Referring to FIG. 6, a schematic of the processing tank 106 is shown. The processing tank 106 is intended to be at least at pilot-scale, and includes a volume of at least 50 gallons. In another embodiment, the processing tank 106 has a volume of at least 150 gallons. In another embodiment, the processing tank 106 has a volume of at least 200 gallons. In another embodiment, the processing tank 106 has a volume of at least 250 gallons. In another embodiment, the processing tank 106 has a volume of at least 500 gallons. The processing tank 106 includes a belt heater 402 configured to supply heat to the contents of the processing tank 106. The belt heaters 402 may be situated on an exterior of the processing tank 106 and are configured to adjust a temperature of the contents within an interior of the processing tank 106 by applying thermal energy to the exterior of the processing tank 106. Ports 404 may be welded to a top wall 412 of the processing tank 106. The ports 404 are sealable apertures configured to allow introduction of contents to the interior of the processing tank 106. In some embodiments, it may be desired to introduce contents toward the top wall 412 of the processing tank 106, in which case the port 404, sometimes referred to as the "short port" or "shorter port", toward the top wall 412 of the processing tank 106 may be used. In other embodiments, it may be desired to introduce contents to the interior of the processing tank 106 toward a bottom wall of the processing tank 106, in which case the port 404, sometimes referred to as the "long port" or "longer port", toward the bottom wall of the processing tank 106 may be used.

The processing tank 106 further includes a level sensor 406, which may depend from the top wall 412 of the processing tank 106, as shown in FIG. 6. The level sensor may include materials such as weighted polyvinyl chloride (PVC) and include a strain gauge. The level sensor 406 is configured to monitor a level, amount, depth, or the like, of the various boundary layers between species that may form in the processing tank 106 during operation thereof. Furthermore the processing tank 106 includes an agitator 408. The agitator 408 may depend from a top wall 412 of the processing tank 106. The agitator 408 is configured to apply a force, for example from a motor 410, onto the contents in the interior of the processing tank 106. The force applied by the agitator 408 may be physical, sonic, magnetic, or other form of force such that the contents in the interior of the processing tank 106 are encouraged to mix together during operation of the processing tank 106. The mixing of the contents in the interior of the processing tank 106 encourages heat transfer between the contents in the interior of the processing tank 106 as well as encourages the formation of yellow grease 112 in the interior of the processing tank 106.

With continued reference to FIG. 6, load cells 420 may be coupled to legs 418 of the processing tank 106. The load cells 420 are configured to monitor the mass of the contents in the interior of the processing tank 106. The load cells 420 are placed outside the interior of the processing tank 106, which prevents the load cells 420 from interfering with the contents in the interior of the processing tank 106, and vice versa. Accordingly, the load cells 420 are not exposed to the potentially deleterious materials that may be present in the interior of the processing tank 106 during operation of the processing tank 106. The load cells 420 may operate as compression-weigh modules, that are configured to calculate the mass of the contents in the interior of the processing tank 106 by measuring a difference in compressive force applied to the load cells 420 from when the processing tank 106 is empty versus when the processing tank 106 is operating. Alternatively, in another embodiment, the load cells 420 may be suspension-modules (not shown) that are configured to calculate the mass of the contents in the interior of the processing tank 106 by measuring a difference in suspension force applied to the load cells 420 from when the processing tank 106 is empty versus when the processing tank is operating. A suspension module load cell would be appropriate, for example, if the processing tank 106 were hanging, rather than resting on the floor or ground. In such an embodiment, the load cells 420 may be placed on a component (not shown) coupled to the processing tank 106 that would allow the processing tank 106 to hang.

With continued reference to FIG. 6, a trash pump 422 is included in the processing tank 106. The trash pump 422 is a pump that is configured to transport the wet solids 116 from the processing tank 106 during operation of the processing tank 106. For example, during operation of the processing tank 106, the trash pump 422 may transport wet solids 116 that do not contribute to the formation of the yellow grease 112 away from the processing tank 106 and into, for example, the hopper 118.

The weir 416 is positioned a distance above the bottom walls of the processing tank 106. When the yellow grease 112 is harvested from the processing tank 106, water is introduced to the processing tank 106. Due to the yellow grease's 112 lower density than water, the addition of the water pushes the yellow grease 112 toward the top wall 412 of the processing tank 106. When the yellow grease reaches a level above an opening to the weir 416, the yellow grease 112 spills into the weir 416, and through the flexible metal piping 414 attached thereto. The flexible metal piping 414 transports the yellow grease 112, thus collected, to the yellow grease tote 114.

Referring back to the process flows shown in FIGS. 3 and 5, the processing tank 106 allows for the careful monitoring of the solvent free extraction at the pilot scale. In an embodiment, ambient temperature FOG lipid extraction agent 102 is pumped into the processing tank 106 via pump 120 using the longer port 404 (shown in FIG. 6) until a predetermined amount is received by the processing tank 106. The load cells 420 (shown in FIG. 6) monitor the mass of the FOG lipid extraction agent 102 added to the processing tank 106. The FOG lipid extraction agent 102 may then be heated to exactly or about 70° C. using the belt heaters 402 while being mixed with the agitator 408 (shown in FIG. 6). Once the FOG lipid extraction agent 102 reaches temperature, a predetermined amount of waste grease 108 that has been preheated to 50° C. is pumped into the processing tank 106 by the pump 122 via the shorter port 404. The predetermined amount of waste grease 108 may be based on the amount of FOG lipid extraction agent 102 supplied to the processing tank 106. For example, the waste grease 108 may be supplied to the processing tank 106 in a ratio of FOG lipid extraction agent 102 to waste grease 108 is between 1:1 and 16:1, preferably 5:1, by mass. In some embodiments, due at least in part to the preheating process of the waste grease 108, the extraction process will be carried out for approximately two hours, which is faster than processes that do not preheat the waste grease 108 before delivering it to the processing tank 106. Once the extraction is complete, the agitator 408 may be shut off and the contents in the processing tank may be allowed to settle for approximately thirty minutes. After settling, water may be pumped into the processing tank 106 via the longer port 404 to displace the resulting yellow grease 112 up to the weir 416 for collection. This displacement may be monitored by the level sensor 406 because the mass of contents should remain constant as yellow grease 112 is removed and water is added simultaneously. The removal of the yellow grease 112 and the addition of water will halt shortly before the layer of water reaches the weir 116. Finally, all the remaining contents (solids and water) may be pumped out from the bottom of the processing tank 106 using the trash pump 422.

EXAMPLES

Examples of the invention are provided below.

In one example, FOG lipid extraction agent 102 was heated to a temperature of 70° C. in a FOG lipid extraction agent tote 104. The FOG lipid extraction agent 102 was then received from the FOG lipid extraction agent tote 104 into the processing tank 106 in an amount of 519.7 kg or 149.15 gallons. Waste grease 108 obtained from a waste water treatment plant and placed in the pre-treatment tank 110 was heated to a temperature of 50° C. The waste grease 108, in an amount of 103.1 kg or 28.55 gallons, was then added to the processing tank 106, and mixed with the FOG lipid extraction agent 102 in the processing tank 106. From the mixing of the FOG lipid extraction agent 102 and the waste grease 108, yellow grease 112 was formed in the amount of 568.5 kg or 168.1 gallons, and removed from the processing tank 106 by gravity feed, and placed in the yellow grease tote 114. Wet solids 116 in the amount of 54.3 kg were then removed from the processing tank 106 and placed in the hopper 118. A summary of the amounts of each species used or obtained in Example 1 is included in Table 1:

TABLE 1

Initial Reactants and Final Products from EXAMPLE 1 in Solvent Free Extraction

| Initial Reactants for Solvent Free Extraction | |
|---|---|
| FOG lipid extraction agent | 519.7 kg or 149.15 gallons |
| Waste Grease from Wastewater Treatment Plant | 103.1 kg or 28.55 gallons |
| Final Products from Solvent Free Extraction | |
| Yellow Grease | 568.5 kg or 168.1 gallons |
| Solids | 54.3 kg |

From the values in Table 1, it may be observed that the sum of the mass of the FOG lipid extraction agent 102 and the waste grease 108 is equal to the yellow grease 112 and the wet solids 116. Accordingly, the entirety of the initial reactants is accounted for in the products of the solvent free extraction process. Particularly, the wet solids 116 include approximately 57% of the initial waste grease 108 received from the wastewater treatment plant. Ordinarily, without utilizing the process described in Example 1, the entirety of the waste grease 108 would be sent to a landfill. However, the process described in Example 1, allows for the extraction of lipids in the form of FOGs from the waste grease 108, leaving wet solids 116 in an amount of 57 wt % of the original waste grease 108. These wet solids 116 are expected to be discarded into landfills, but because the wet solids 116 are only 57 wt % of the original waste grease 108, materials that would typically contribute a significant burden of waste to landfills are instead used to form yellow grease 112 and may be used in other applications, such as biodiesel feedstock. Furthermore, the methods described herein increase the materials useful to other applications such as biodiesel feedstock. For example, due to the methods described herein, the yellow grease 112 includes mass 8.6 wt % greater than the FOG lipid extraction agent 102 fed into the process flow 100. Accordingly, the methods described herein both reduce materials that would ordinarily be destined for landfills while simultaneously increasing useful feedstocks.

To further investigate the efficacy of the above-described system and methods, the following procedure was conducted and results recorded.

Esterification of Yellow Grease to decrease % FFA. Yellow grease products were converted to biodiesel using acid esterification and base transesterification. The first step of the conversion is to titrate the yellow grease using the greener titration method. The % FFA and the yellow grease volume are used to calculate the volumes of methanol and sulfuric acid needed. The yellow grease was heated to 60° C. in a reaction bottle. The methanol-acid mixture is then added to the bottle, and the bottle is capped. The reaction proceeds for 3 hours with continuous stirring. The esterification product is then placed in a separatory funnel. The bottom layer is removed to be dried for about an hour, and the top layer of methanol is collected as waste.

Transesterification of Yellow Grease to Produce Biodiesel. After drying, the oil was titrated to ensure esterification was successful (% FFA is <1), and it was heated to 55° C. in a reaction bottle. Quantities of methanol and sodium hydroxide for base transesterification were calculated based on the volume of oil and combined to dissolve completely. The methanol mixture was added to the reaction bottle and the reactants were stirred and heated for 2 hours. The product was placed in a separatory funnel and the bottom layer, (waste glycerol), was removed. The biodiesel was then collected and stirred with water to remove soaps. The water and biodiesel were separated, water & soap were removed, and the biodiesel is washed again for a total of four washes (Chai 2021). Finally, the biodiesel was collected and dried on a hot plate.

Testing of Biodiesel from FOG's Feedstock. The resulting biodiesel was tested to ensure quality control of the final product. These tests were performed in a lab at a biodiesel plant in the New England area. The biodiesel underwent all testing that the plant performs on their own biodiesel for certification.

Energy Outputs for Pilot. The highest amount of energy that was consumed during the pilot process was during the heating of the waste grease 108 and FOG lipid extraction agent 102. There was some energy consumed during the pumping of the material, but it can be considered negligible. A summary of the energy consumption can be seen in Table 3. A total of 36.5 kWh was used to conduct on full extraction conducted in a batch process. This heat consumption can be lowered if heat recovery is implemented and the process is converted into a continues process.

TABLE 2 kWh used in Pilot and estimated cost.

| Unit | kWh | Cost* |
|---|---|---|
| Heating Processing Unit | 23.5 | $2.80 |
| Heating Pretreatment Unit | 11.5 | $1.37 |
| Maintenance Heating for SFE | 1.3 | $0.15 |
| Total | 36.5 | $4.32 |

*Based on Commercial Electricity rates in Cincinnati, OH

Quality of Yellow Grease derived from FOGs. The most important property of yellow grease 112 is that it must maintain a % FFA below 15% even after the SFE process to be suitable for biodiesel feedstock applications. The initial FOG lipid extraction agent 102 used in the process was found to have a % FFA of around 5, which is typical of FOG lipid extraction agent, generally. After conducting the SFE at approximately a 5.04 ratio, the resulting FFA of the yellow grease was below 10%. This is desirable in yellow grease 112 as it is possible to turn into biodiesel using standard esterification and transesterification. The esterification procedures usually must be altered in yellow grease 112 with % FFA above 10% and below 15%. These alterations usually must deal with increasing the reaction time or conducting a second esterification.

TABLE 3

Percent FFA before and after SFE Process

| Data | Value |
|---|---|
| Initial % FFA of WCO | 5.05 |
| Final % FFA of Yellow Grease | 9.78 |

TABLE 3-continued

Percent FFA before and after SFE Process

| Data | Value |
|---|---|
| Ratio of WCO to WG used | 5.04 |
| Mass gained of YG (Yield) from SFE | 8.6% |

Properties of Biodiesel derived from Resulting Yellow Grease. The resulting biodiesel was able to meet all the benchmarks required to be certified as biodiesel at a biodiesel plant. A summary of the results can be seen in Table 4 below. It is desired that B100 biodiesel has as close to zero di- and triglycerin as possible. This lower concentration leads to higher conversion for biodiesel. A result of amounts higher than are attributed to low NaOH dosing in transesterification. Biodiesel with minimal impurities averages a cold soak filtration time between 90 and 120 secs. This result can be improved though the use of vacuum filtration though a media such as Diatomaceous Earth and Sipernat.

TABLE 4

Properties of B100 Biodiesel from Pilot Process

| Property | Test Method | Specification | Results |
|---|---|---|---|
| Visual Inspection | ASTM D4176 | Grade 2 max | 1 |
| Density | ASTM D1298 | — | 0.876 |
| Flash Point | ASTM D93 | 93 min. ° C. | >123 |
| Methanol Content | AOCS Ck2-09 | 0.20% max | 0.036 |
| Free Glycerin | AOCS Ck2-09 | 0.020% max | 0.0002 |
| Monoglycerin | AOCS Ck2-09 | — | 0.5996 |
| Diglycerin | AOCS Ck2-09 | — | 0.0194 |
| Triglycerin | AOCS Ck2-09 | — | 0.0472 |
| Total Glycerin | AOCS Ck2-09 | 0.24% max | 0.1078 |
| Moisture | AOCS Ck2-09 | % | 0.1128 |
|  | ASTM D6304 | % | 0.13 |
| Acid Number | AOCS Ck2-09 | 0.5 mg KOH/g max | 0.176 |
| Sulfur | ASTM D6571 | <15 ppm | 10.8 ppm |
| Cloud Point | AOCS Ck2-09 | Report. ° C. | 1.54 |
| Cold Soak Filtration | ASTM D7501 | 360 seconds max | 217 |

Conclusions. A pilot scale SFE process was made to produce yellow grease, a biodiesel feedstock, as well as decrease FOG's at WWTP. Used cooking oil was used to extract lipids from FOG's and this lead to an increase of 8.6% of yellow grease and a decrease of 52.7% in FOG's. The resulting yellow grease was able to be converted into biodiesel. This biodiesel met the requirements of quality testing at a biodiesel plant.

The results of the SFE processing using the FOG data from FIGS. 1 and 2 is shown in Table 5. Three FOG lipid extraction agents with varying % FFAs were used to carry out the SFE process.

TABLE 5

Summary of results from SFE using 4.5 extraction ratio on Winter 2021 samples shown in FIG. 1 and FIG. 2 using various waste greases

|  |  | % FFA | | |
|---|---|---|---|---|
| | WCO | 0.77 | 1.56 | 2.7 |
| Yellow Grease | Winter 2021, FIG. 1 | 12.3 | 14 | 13.9 |
|  | Winter 2021, FIG. 2 | 13.2 | 13.6 | 15.4 |

As shown in Table 5, the lower initial % FFA in the FOG lipid extraction agent used for the SFE, the lower the % FFA will be for the resulting yellow grease. Most of the yellow greases were under the desired 15% FFA so that it would remain in the yellow grease classification. Typically, the yellow grease from Northern Kentucky is higher in % FFA and this can be attributed to the larger lipid fraction that Northern Kentucky waste grease has over Southwest Ohio waste grease or it can be stored longer. The WCO from the restaurant sheds some light on the upper limit of the WCO that can be used for the SFE process. From previous WCO samples from restaurants, it was seen that 2.7% was a very typical % FFA from this source. Although undesired, a % FFA above 15% can be remedied by mixing with additional WCO.

The concept described herein was further verified against other methods. For example, brown grease was attempted to be manufactured into biodiesel without blending with a brown grease from a WWTP in the New England area, where the FOGs were pretreated (filtered and heated) into dark brown liquid, to be burned with other biosolids for volume reduction. In this attempt, water formed from the esterification process and slowed down the process. In such processes, water often needs to be removed for the reaction to proceed further, which means pausing the reaction and draining water out. After the water is drained, titration and a further addition of chemicals (methanol and sulfuric acid) must occur based on the new FFA value. Then a second esterification occurs. This process is not only is time consuming and needing more chemicals, it also is very likely to fail. If the second esterification gets FFA<2%, then a transesterification occurs to convert the feedstock into biodiesel. In sharp contrast, the systems and methods described herein are able to convert brown grease into a yellow grease (FFA<15%), reducing the need for a second esterification by the biodiesel manufacturer, and exhibits an increased success rate in biodiesel conversion. Results of attempts to convert brown grease into usable biodiesel products are below in Table 6:

TABLE 6

Attempted Brown Grease Conversion to Biodiesel Product vs. Yellow Grease Conversion to Biodiesel Product

| Feedstock | Initial FFA (%) | $1^{st}$ Ester FFA (%) | $2^{nd}$ Ester FFA (%) | Trans FFA (%) | Converted to Biodiesel product? |
|---|---|---|---|---|---|
| Brown Grease 1 | >100 | 1.67 (3 hr) | 1.69 (2 hrs) | 1.7 (2 hr) | Inconclusive |
| Brown Grease 2 | >100 | 12.2 (3 hr) | 7.3 (2 hrs) | N/A | No |
| Brown Grease 3 | >100 | 51.8 (3 hr) | 65.5 (3 hrs) | N/A | No |
| Brown Grease 4 | >100 | 83.62 (4 hr) | N/A | N/A | No |
| Brown Grease 5 | >100 | 84.9 (2 hr) | N/A | N/A | No |
| Yellow Grease | 100% | 11.03 (3 hr) | 2.08 (2 hr) | 0.5 | Yes |

N/A: Unable to proceed further.

These attempts at using brown grease as a biodiesel feedstock are shown above, in Table 6, to be unworkable. Furthermore, brown grease has a sulfur content that exceeds the 15 ppm sulfur content that is recommended or required for appropriate biodiesel materials. Prior attempts to use brown grease as a biodiesel feedstock focused on removing sulfur content by, for example, acid catalyzed processes using alcohol vapor as a solvent. These attempts prove to be hazardous and expensive, due to the use of the alcohol vapor solvent, or failed to consistently meet the 15 ppm sulfur specification for biodiesel materials.

The embodiments of the present invention recited herein are intended to be merely exemplary and those skilled in the art will be able to make numerous variations and modifications to it without departing from the spirit of the present invention. Notwithstanding the above, certain variations and modifications, while producing less than optimal results, may still produce satisfactory results. All such variations and modifications are intended to be within the scope of the present invention as defined by the claims appended hereto.

What is claimed is:

1. A method of forming a yellow grease, the method comprising:
    delivering a FOG lipid extraction agent into a processing tank from a FOG lipid extraction agent tote;
    preheating a FOG to a temperature of between 35° C. and 95° C. in a pretreatment tank;
    delivering the FOG, after being preheated to the temperature between 35° C. and 95° C. to the processing tank;
    mixing the preheated FOG with the FOG lipid extraction agent in the processing tank to form the yellow grease;
    harvesting the yellow grease to a yellow grease tote from the processing tank; and
    delivering an amount of wet solids from the processing tank to a hopper.

2. The method of claim 1, wherein delivering the FOG lipid extraction agent into the processing tank occurs when the FOG lipid extraction agent is at ambient temperature.

3. The method of claim 1, wherein harvesting the yellow grease comprises:
    adding water to the processing tank until a level of the yellow grease in the processing tank reaches a weir located within the processing tank, the weir accepting the yellow grease, and transporting the yellow grease from the weir to the yellow grease tote.

4. The method of claim 1, wherein a ratio of the FOG lipid extraction agent to the FOG in the processing tank is between 1:1 and 16:1, by mass.

5. The method of claim 1, wherein the method is completed from two to four hours.

6. The method of claim 1, wherein the processing tank comprises a volume of between 50 gallons and 500 gallons.

7. The method of claim 1, wherein the FOG lipid extraction agent is heated to a temperature of between 40° ° C. and 100° ° C. prior to being delivered to the processing tank.

* * * * *